(12) United States Patent
Stewart, Jr.

(10) Patent No.: US 7,055,826 B2
(45) Date of Patent: Jun. 6, 2006

(54) SEAL AND BEARING ASSEMBLY

(75) Inventor: Lands J. Stewart, Jr., Durant, OK (US)

(73) Assignee: Dunrite Manufacturing Co., Inc., Durant, OK (US)

( * ) Notice: Subject to any disclaimer, the term of this patent is extended or adjusted under 35 U.S.C. 154(b) by 393 days.

(21) Appl. No.: 09/920,682

(22) Filed: Aug. 2, 2001

(65) Prior Publication Data

US 2003/0025273 A1     Feb. 6, 2003

(51) Int. Cl.
*F16J 15/34*     (2006.01)

(52) U.S. Cl. ............... 277/358; 277/362; 277/579; 384/619

(58) Field of Classification Search ............... 277/390, 277/399, 358, 348, 422, 377, 362, 363, 579, 277/370; 384/618, 619
See application file for complete search history.

(56) References Cited

U.S. PATENT DOCUMENTS

| | | | | |
|---|---|---|---|---|
| 579,857 | A * | 3/1897 | Bradshaw | 384/593 |
| 3,376,084 | A * | 4/1968 | McKee | 384/536 |
| 3,473,814 | A * | 10/1969 | Bastow | 277/562 |
| 3,658,395 | A * | 4/1972 | Hallerback | 384/484 |
| 3,988,047 | A * | 10/1976 | Kufner | 384/619 |
| 4,809,992 | A * | 3/1989 | Kemp et al. | 277/369 |
| 4,872,770 | A * | 10/1989 | Dickinson | 384/484 |
| 5,370,404 | A * | 12/1994 | Klein et al. | 277/572 |
| 5,425,584 | A * | 6/1995 | Ide | 384/99 |
| 5,558,491 | A * | 9/1996 | Andrews | 415/111 |
| 5,690,341 | A * | 11/1997 | Prough et al. | 277/9 |
| 5,816,711 | A * | 10/1998 | Gingrich | 384/488 |
| 5,865,597 | A * | 2/1999 | Ozawa | 415/109 |
| 6,186,510 | B1 * | 2/2001 | Reagan | 277/371 |

FOREIGN PATENT DOCUMENTS

DE     44 08 831 A1 *    9/1995

* cited by examiner

*Primary Examiner*—Chuck Y. Mah
*Assistant Examiner*—Michael J. Kyle
(74) *Attorney, Agent, or Firm*—McAfee & Taft

(57) ABSTRACT

A seal and bearing assembly for use in rotating machinery of the type having a rotor which turns within a stationary housing. The rotor and housing define a seal cavity therein in which the seal and bearing assembly is positioned. The assembly comprises a first bearing race adapted for engagement with a rotating surface on the rotor or a stationary surface, a second race adapted for engagement with the other of the rotating or stationary surfaces, and a plurality of bearing elements disposed between the first and second races. A bearing cage may be used which defines a plurality of bearing openings therein disposed between the first and second races, wherein the bearing elements are disposed in the bearing openings. Preferably, the bearing elements are rollers. In one embodiment, the seal and bearing assembly also comprises a ring that substantially seals along the stationary surface in the housing, wherein the ring defines a race engagement surface thereon, the first bearing engages the rotating surface, and the second race engages the race engagement surface. In a preferred embodiment, the assembly has first races on opposite sides of the ring with corresponding second races and bearing elements and/or cages. The bearing components are sized such that any fluid flow or leakage therethrough is minimal.

16 Claims, 3 Drawing Sheets

SEAL AND BEARING ASSEMBLY

BACKGROUND OF THE INVENTION

1. Field of the Invention

This invention relates to seals used in rotating machinery, and more particularly, to a seal assembly having a seal ring supported by one or more bearings and having a minimal fluid flow or leakage path therethrough.

2. Brief Description of the Prior Art

The use of seals and bearings in rotating machinery is well-known. An example of this kind of machinery is one which has a housing with a rotating member disposed therein. Such rotating members frequently have shafts or axles extending therefrom, and bearings are used to support the shafts while allowing rotation of the shaft and rotating member within the housing. Examples of such devices are pumps, turbines, etc. A variety of seals are used in these to keep fluid in the housing.

A problem with the sealing in such equipment is that it is necessary to seal between a moving element connected to the rotating member and a stationary element connected to the housing. This usually requires precise relative positioning of the moving and stationary elements with respect to one another and with respect to the rotor and housing.

The present invention provides a solution for this problem by utilizing a seal assembly which is precisely assembled on either the rotating or stationary member while allowing less precise, flexible positioning with respect to the other. Tight tolerances in the seal and bearing assembly insure that there is only controlled, minimal fluid flow or leakage therethrough.

SUMMARY OF THE INVENTION

The present invention is a seal and bearing assembly for use in rotating machinery.

Generally, the invention may be described as a seal for use adjacent to a rotating race engagement surface. The seal comprises a first race adapted for engagement with one of the rotating race engagement surface and the stationary surface, a second race adapted for engagement with the other of the race engagement surface and the stationary surface, and a plurality of bearing elements disposed between said first and second races. The first race defines outer and inner annular portions, and the second race is disposed between these annular portions. The annular portions are substantially concentric.

Preferably, one of the rotating race engagement surface and the stationary surface defines a pair of annular grooves therein. Each of the annular portions of the first race extends into one of the grooves. The annular portions are sized to be spaced from bottom surfaces of the grooves.

One embodiment of the invention may also be described as a seal assembly for use adjacent to a rotating surface and a stationary surface which comprises a ring having a sealing surface for substantially sealing between the ring and at least a portion of the stationary surface, the ring also having a race engagement surface thereon. The seal assembly further comprises a first race adapted for engagement with at least a portion of the rotating surface and for rotation therewith, a second race adapted for engagement with the race engagement surface on the ring, and a plurality of bearing elements disposed between the first and second races. The seal assembly may further comprise a bearing cage defining a plurality of bearing openings therein disposed between the first and second races, wherein the bearing elements are disposed in these bearing openings.

In a preferred embodiment, the sealing surface on the ring is an outer peripheral surface thereof.

Preferably, the first race has a substantially planar first bearing surface thereon, the second race has a substantially planar second bearing surface thereon, and the first and second bearing surfaces are substantially parallel. The bearing elements engage these first and second bearing surfaces.

In a preferred embodiment, the first race defines a recess therein, and the second race and the bearing elements are disposed in the recess.

The ring preferably defines a pair of annular grooves therein, and the first race comprises a pair of annular portions, each of the annular portions extending into a corresponding one of the grooves. The grooves may be substantially concentric. The annular portions are preferably closely spaced from bottom surfaces of the groove so that the first races do not significantly contact the ring while allowing for only minimal fluid flow or leakage therebetween. In this embodiment, the race engagement surface is between the grooves.

In one preferred embodiment, the race engagement surface on the ring is one of a pair of race engagement surfaces disposed on opposite sides of the ring, the first race is one of a pair of first races engaging different portions of the rotating surface on opposite sides of the ring, the second race is one of a pair of second races disposed on opposite sides of the ring and engaging a corresponding one of the race engagement surfaces, and the bearing elements are disposed between each of the corresponding sets of said first and second races.

Stated in another way, the present invention may be described as an apparatus comprising a stationary housing having a housing sealing surface therein and a rotor rotatably disposed in the housing. The rotor and housing define a seal cavity therebetween. The apparatus further comprises a ring disposed in the bearing cavity and having a ring sealing surface thereon for substantially sealing along at least a portion of the housing sealing surface and further having a bearing race engagement surface thereon, a first bearing race adapted for engagement with at least a portion of the rotor and rotatable therewith, a second bearing race adapted for engagement with the race engagement surface on the ring, a bearing cage defining a plurality of bearing openings therein disposed between the first and second bearing races, and a plurality of bearing elements disposed in the bearing openings.

The housing sealing surface is preferably substantially cylindrical, and the ring sealing surface is substantially concentric with the housing sealing surface. The ring sealing surface may be an outer peripheral surface of the ring. The housing and ring sealing surfaces are preferably in a closely spaced relationship with one another.

In a preferred embodiment of the apparatus, the first bearing race has a substantially planar first bearing surface thereon, the second bearing race has a substantially planar second bearing surface thereon, and the first and second bearing surfaces are substantially parallel. The bearing elements engage the first and second bearing surfaces.

Preferably, the first bearing race defines a recess therein, and the second bearing race, cage and bearing elements are disposed in this recess.

Preferably, the ring defines a pair of substantially concentric annular grooves therein, and the first bearing race comprises a pair of annular portions, each of the portions extending into one of the grooves. Preferably, the annular portions are close, spaced from the bottom surfaces of the grooves to provide only minimal fluid leakage thereby, and the race engagement surface of the ring is between the grooves.

In one preferred embodiment of the apparatus, the race engagement surface is one of a pair of race engagement surfaces disposed on opposite sides of the ring, the first bearing race is one of a pair of first bearing races engaging different portions of the rotor on opposite sides of the ring, the second bearing race is one of a pair of second bearing races disposed on opposite sides of the ring and engaging a corresponding one of the race engagement surfaces, and the bearing cage is one of a pair of bearing cages disposed between corresponding first and second bearing races with bearing elements disposed in the bearing openings of the bearing cages.

In the preferred embodiment, the bearing elements are rollers.

Numerous objects and advantages of the invention will become apparent as the following Detailed Description of the Preferred Embodiment is read in conjunction with the drawings illustrating such embodiment.

DESCRIPTION OF THE PREFERRED EMBODIMENT

Figure 1:
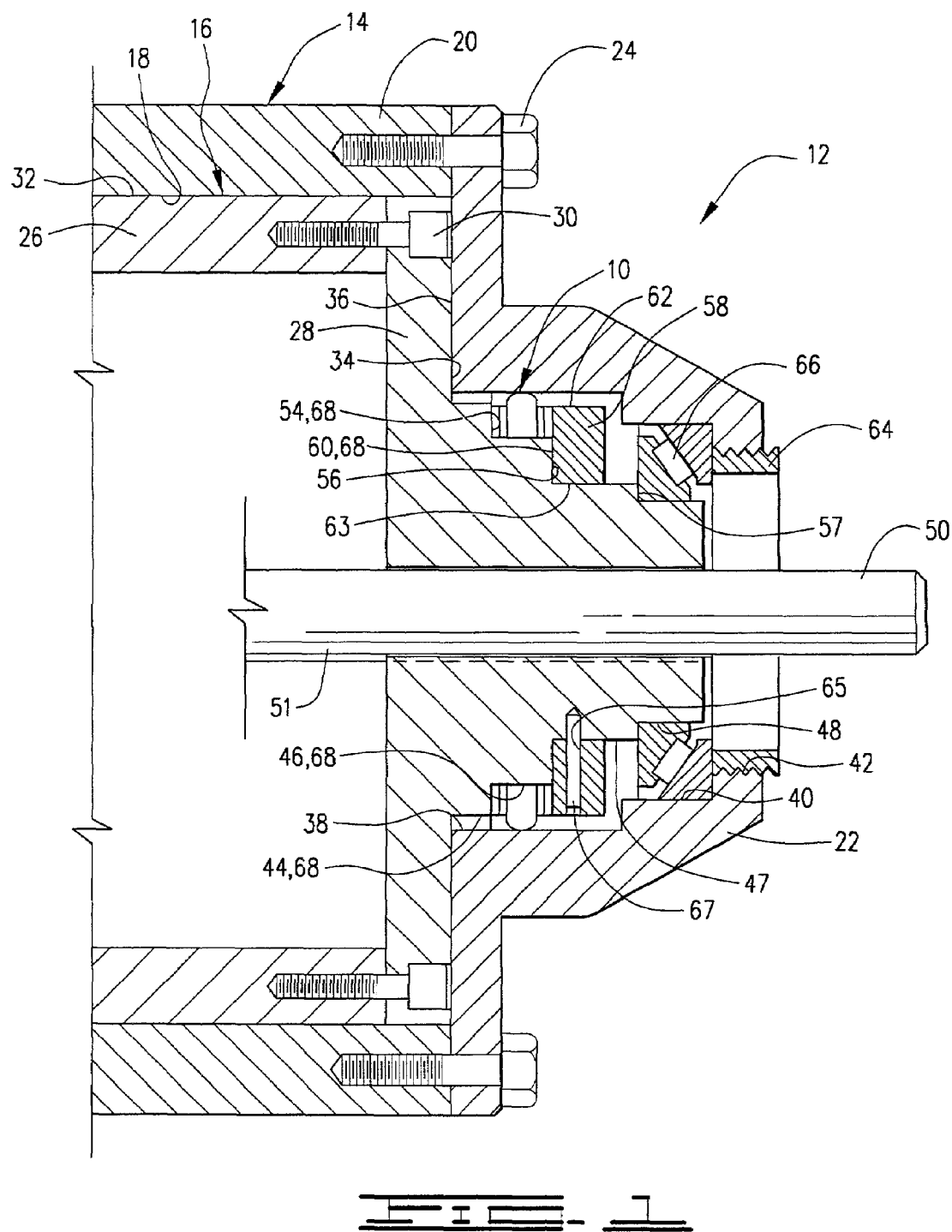
FIG. 1 shows a partial cross-section of a piece of rotating machinery incorporating a first embodiment of the seal and bearing assembly of the present invention.

Referring now to the drawings, and more particularly to FIG. 1, a first embodiment of the seal and bearing assembly of the present invention is generally shown and designated by the numeral 10. For purposes of illustration, first embodiment assembly 10 is shown disposed in a piece of rotating machinery 12, also referred to herein as machine 12.

Because the subject of the present invention is the seal and bearing assembly, such as first embodiment 10, the only details of machine 12 that are disclosed are those necessary to understand the operation of the seal and bearing assembly. It should be understood that machine 12 can be any type of rotating machinery, such as a pump or turbine, while seal and bearing assembly 10 is adaptable to virtually any type of rotating machinery, and the invention is not intended to be limited to any particular machine 12. Therefore, as illustrated, machine 12 has a stationary housing 14 with a rotating member 16 therein, also referred to herein as rotor 16. Rotor 16 is adapted for rotation in a cavity 18 defined in stationary housing 14. Cavity 18 is generally fluid filled.

Housing 14 includes an outer case 20 closed at opposite ends thereof by an end frame or end member 22. End frame 22 thus forms an end or side of housing 14. End frame 22 is attached to case 20 by a plurality of fasteners 24 of a kind known in the art. A gasket (not shown) of a kind known in the art may be placed between each end frame 22 and case 20 to seal therebetween.

For machine 12 illustrated, rotor 16 includes a drum 26 with a drum end 28 on opposite ends of the drum. Drum ends 28 are attached to drum 26 by a plurality of fasteners 30 of a kind known in the art.

Rotor 16 has an outer surface 32 formed by drum 26 and drum ends 28 which fits within cavity 18 in housing 14. Rotor 16 has an outwardly facing rotor end surface 34 which faces a corresponding housing end surface 36 on end frame 22. The overall length of case 20 is slightly longer than the overall length of rotor 16 so that there is no contact between rotor end surface 34 and housing end surface 36. Cavity 18 in housing 14 is larger than outer surface 32 on rotor 16. Thus, it will be seen by those skilled in the art, that rotor 16 is free to rotate within housing 14.

End frame 22 of housing 14 has a first bore 38, a smaller second bore 40 and a still smaller threaded surface 42 therein. End frame 22 may be a single piece, as shown in FIG. 1, or may be made from multiple pieces.

Drum end 28 of rotor 16 has a first outside diameter 44, a second outside diameter 46, a third outside diameter 47 and a fourth outside diameter 48 thereon. A shaft or axle 50 extends longitudinally outwardly from drum end 28 and is engaged thereto by a spline 51 or other known means. Drum end 28 and shaft 50 may also be integrally formed.

A first shoulder 54 is formed on drum end 28 of rotor 16 between first outside diameter 44 and second outside diameter 46. A second shoulder 56 is formed on drum end 28 between second outside diameter 46 and third outside diameter 47. A third shoulder 57 is formed between third outside diameter 47 and fourth outside diameter 48.

A collar 58 is disposed on a portion of end drum 28 and has an outside diameter 62 which is approximately the same size as first outside diameter 44 on drum end 28, although the invention is not intended to be limited to such a configuration.

Collar 58 has a bore 63 therethrough which preferably is sized to be pressed on third outside diameter 47 of drum end 28 to hold seal and bearing assembly 10 in place. A hole 65 may be drilled radially through collar 58 and into drum end 28 to receive a lock pin 67 for locking the collar in place. Thus, collar 58 rotates with drum end 28, and thereby with shaft 50, and may be considered a portion of rotor 16 because all of these components form a rotating member. Other means of attaching collar 58, such as threaded engagement with drum end 28, etc., could also be used.

Figure 2:
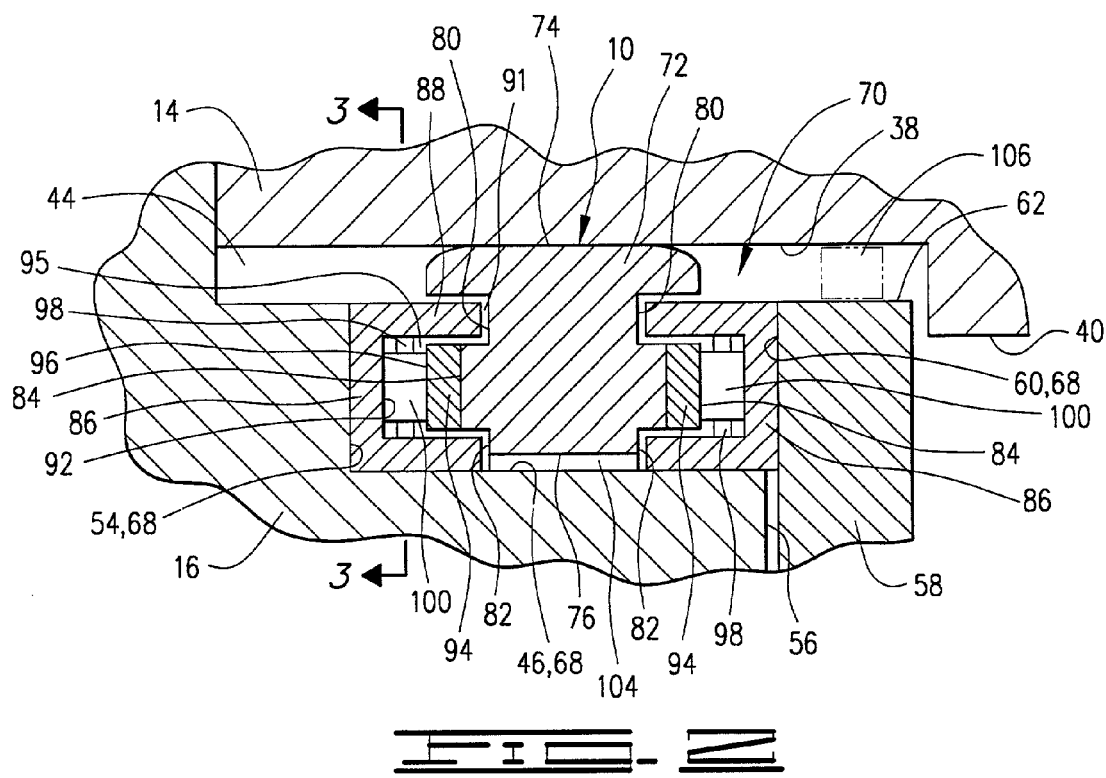
FIG. 2 is a detailed cross-sectional view of the first embodiment.

Side surface 60 of collar 58 is spaced slightly from shoulder 56 to allow for tolerances in seal and bearing assembly 10, as seen in FIG. 2

Drum 28, and thus shaft 50, are supported within end frame 22 by a carrier bearing 66. Bearing 66 is illustrated as a tapered roller bearing, but other bearing configurations could also be used. Bearing 66 is positioned on fourth outside diameter 48 of drum end 28 adjacent to third shoulder 57. A locking ring or threaded sleeve 64, of a kind known in the art, is threadingly engaged with threaded surface 42 in end frame 22 and is used to lock each of bearings 66 in a known manner.

Referring now to FIGS. 1 and 2, first shoulder 54 and second outside diameter 46 of drum end 26 and side surface 60 of collar 58 may be said to jointly define a rotating surface 68 on rotor 16 which rotates within first bore 38 in end frame 22 which thus may be referred to as a stationary surface 38. Rotating surface 68 and stationary surface 38 will be seen to form a generally annular seal cavity 70 between drum end 28 of rotor 16 and end frame 22 of housing 14. Seal and bearing assembly 10 of the present invention is disposed in seal cavity 70.

Figure 3:
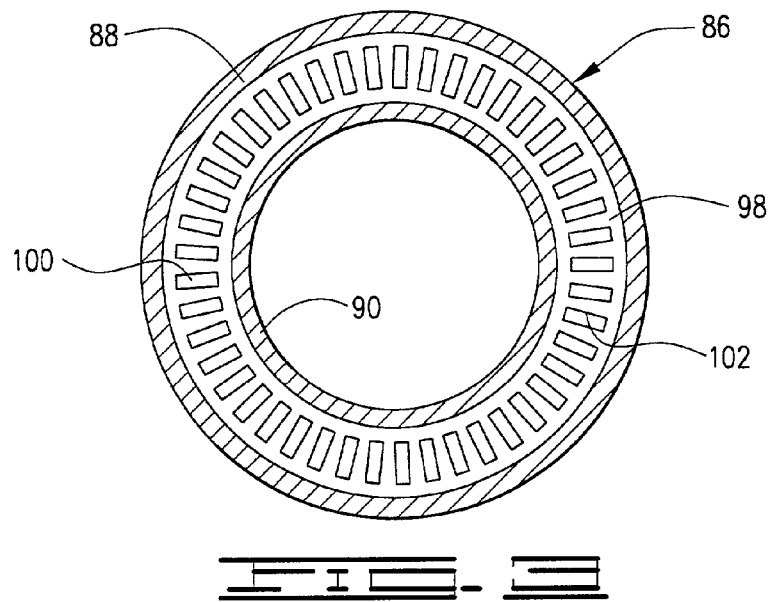
FIG. 3 is a cross-section taken along lines 3—3 in FIG. 2.

Referring now to FIGS. 2 and 3, details of first embodiment seal and bearing assembly 10 will be discussed.

Seal and bearing assembly 10 comprises a ring 72 having a sealing surface 74 sized to closely fit within stationary surface 38 preferably to form a metal-to-metal seal therebetween. Thus, ring 72 in the first embodiment is stationary. Ring 72 has an inner bore 76 defined therethrough which is radially spaced from second outside diameter 46.

Ring 72 defines also a pair of annular, outer grooves 80 on opposite sides thereof and a pair of annular, inner grooves 82 on opposite sides thereof. A radially extending race engagement surface 84 extends between grooves 82 and 80.

A first or outer race 86 is disposed between ring 72 and first shoulder 54 such that the first race substantially flatly contacts first shoulder 54. First race 86 has an outer annular portion 88 which extends into outer groove 80 and a substantially concentric inner annular portion 90 which extends into inner groove 82 without contacting the bottoms of the grooves. Annular portions 88 and 90 and grooves 80 and 82 are sized such that a narrow gap 91 is defined therebetween. Gap 91 is sized to provide for a minimal flow or leakage path therethrough.

Outer race 86 has a substantially planar bearing surface 92 thereon which may also be referred to as a first bearing surface 92. A second or inner race 94 is disposed in a recess 95 defined between annular portions 88 and 92 of outer race 86 such that the inner race substantially flatly contacts race engagement surface 84 on ring 72. Second race 94 has a substantially planar bearing surface 96 thereon. Bearing surface 96 may also be referred to as a second bearing surface 96 which faces first bearing surface 92.

A bearing cage 98 is disposed longitudinally between first and second bearing surfaces 92 and 96 and radially between annular portions 90 and 88 of first race 86. A plurality of bearing elements 100 are disposed in bearing openings 102 defined in cage 98 in a manner known in the art. In the preferred embodiment, bearing elements 100 are roller bearings so that a roller thrust bearing is formed, although no thrust loading is actually applied, but the invention is not intended to be limited only to roller bearings. For example, but not by way of limitation, ball bearings might also be used.

Disposed between ring 72 and side surface 60 of collar 58 are another outer race 86, inner race 94, cage 98 and bearing elements 100 which are substantially identical to those previously described.

In operation, machine 12 is assembled as shown. As previously described, the outermost portion of rotor 16 is slightly shorter than the length of case 20 so that any loading in a longitudinal direction will not cause the rotor to undesirably engage housing end surface 36. Rather, any loading in a longitudinal direction will be absorbed by carrier bearings 66. Bearings 66 also absorb radial loading on rotor 16.

The sealing of fluid in cavity 18 is provided by metal-to-metal sealing or minimal leakage between sealing surface 74 and stationary surface 38 in housing 14, as best seen in FIG. 2. Additional fluid sealing is provided by a labyrinth-like flow path through seal and bearing assembly 10. That is, fluid pressure in housing 14 (applied from the left as seen in FIG. 2), will cause fluid to flow to the right through seal and bearing assembly 10, including gaps 91. Any fluid leaked must flow through gap 91 between annular portion 88 of outer race 86 and outer groove 80, between first race 94 and annular portion 88, around cage 98 and bearing elements 100 between first and second bearing surfaces 92 and 96, between second race 94 and annular portion 90 of first race 94, through another gap 91 between annular portion 90 and inner groove 82, through a gap 104 between inner bore 76 of ring 72 and second outside diameter of drum end 28. From there it must pass in a reverse direction through the bearing components on the other side of ring 72. All of the components are sized with close tolerances so that there is a significant pressure drop through this flow passageway which results in a relatively low pressure on the right side of ring 72 and minimal leakage. The fluid flow that does occur also provides lubrication for bearing elements 100 and bearing surfaces 92 and 96 and also provides lubrication for carrier bearings 66.

For applications where substantially no leaking is desirable, a known rotating seal 106 could be disposed between collar 58 and stationary surface 38 or at some other location.

Although first embodiment seal and bearing assembly 10 has been described as having certain rotating components and stationary components, those skilled in the art will see that these rotating and stationary components can be reversed and that the seal and bearing assembly 10 will function in the same manner.

Figure 4:
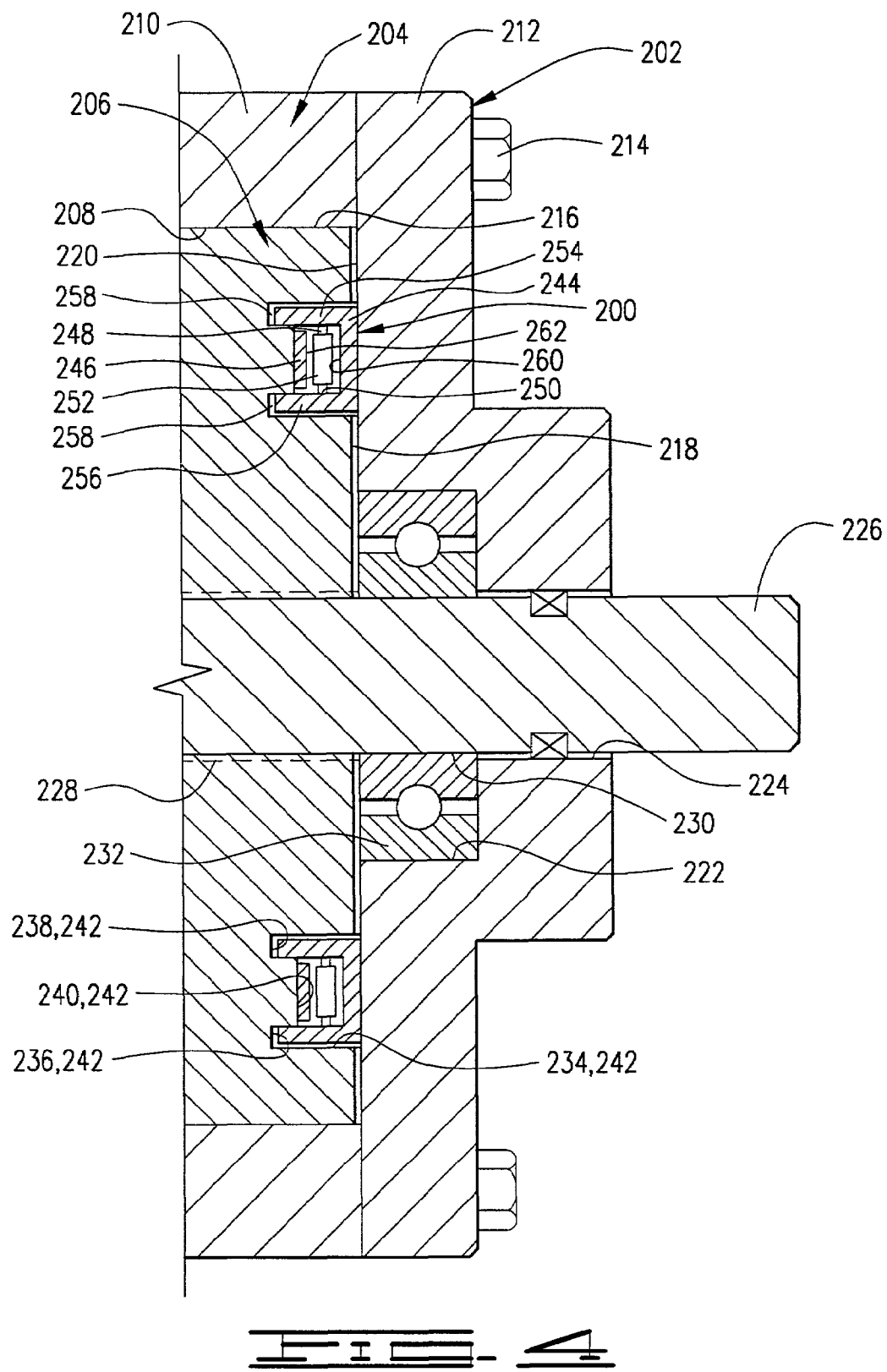
FIG. 4 shows a second embodiment of the seal and bearing assembly.

Referring now to FIG. 4, a second embodiment of the seal and bearing assembly of the present invention is shown and generally designated by the numeral 200. For purposes of illustration, second embodiment assembly 200 is shown disposed in a piece of rotating machinery 202, also referred to herein as machine 202.

As with the previously described first embodiment, the only details of machine 202 that are disclosed are those necessary to understand the operation of the seal and bearing assembly. It should be understood that machine 202 can be any type of rotating machinery, such as a pump or turbine, while seal and bearing assembly 200 is adaptable to virtually any type of rotating machinery, and the invention is not intended to be limited to any particular machine 202. Therefore, as illustrated, machine 202 has a stationary housing 204 with a rotating member 206 therein, also referred to herein as rotor 206. Rotor 206 is adapted for rotation in a cavity 208 defined in stationary housing 204. Cavity 208 is generally fluid filled.

Housing 204 includes an outer case 210 closed at opposite ends thereof by an end frame or end member 212. End frame 212 thus forms an end or side of housing 204. End frame 212 is attached to case 210 by a plurality of fasteners 214 of a kind known in the art. A gasket (not shown) of a kind known in the art may be placed between each end frame 212 and case 210 to seal therebetween.

Rotor 206 has an outer surface 216 which fits within cavity 208 in housing 204. Rotor 206 has an outwardly facing rotor end surface 218 which faces a corresponding housing end surface 220 on end frame 212. The overall length of case 210 is slightly longer than the overall length of rotor 206 so that there is no contact between rotor end surface 218 and housing end surface 220. Cavity 208 in housing 204 is larger than outer surface 216 on rotor 206. Thus, it will be seen by those skilled in the art, that rotor 206 is free to rotate within housing 204. End frame 212 of housing 204 has a first bore 222 and a smaller second bore 224 therein. End frame 212 may be a single piece, as shown in FIG. 4, or may be made from multiple pieces.

A shaft or axle 226 extends longitudinally outwardly from rotor 206 and is engaged thereto by a spline 228 or other means. Rotor 206 and shaft 226 may also be integrally formed. Shaft 226 has an outside diameter 230 thereon.

Shaft 226, and thus rotor 206, are supported at each end within the corresponding end frame 212 by a carrier bearing 232. Bearing 232 is disposed on first outside diameter 230 on shaft 226 and within first bore 222 in end frame 212. Positioning and locking of bearing 232 are as is known in the art and no further details are necessary for the understanding of the present invention.

Rotor 206 defines a rotating surface 234 thereon in the form of an annular recess. Recess 234 includes an outer groove 236 and an inner groove 238. Outer and inner grooves 236 and 238 are substantially concentric. A radially extending race engaging surface 240 is defined between outer and inner grooves 236 and 238. Race engaging surface 240 faces is substantially parallel to housing end surface 220. Housing end surface 220 can also be referred to as stationary surface 220. Recess or rotating surface 234 and stationary surface 220 will be seen to form a generally annular seal cavity 242 between rotor 206 and end frame 212.

Details of second embodiment seal and bearing assembly 200 will now be discussed.

Seal and bearing assembly 200 comprises a first or outer race 244, a second or outer race 246 and a bearing cage 248 disposed between the first and outer races. Bearing cage defines a plurality of bearing openings 250 therein, and a plurality of bearing elements 252 are disposed in the bearing openings. These components of second embodiment seal and bearing assembly 200 are substantially identical to first race 86, second race 94, bearing cage 98 and bearing elements 100 of first embodiment seal and bearing assembly 100.

First race 244 has an outer annular portion 254 which extends into outer groove 236 and a substantially concentric inner annular portion 256 which extends into inner groove 238 without contacting the bottoms of the grooves. Annular portions 254 and 256 and grooves 236 and 238 are sized such that a narrow gap 258 is defined therebetween. Gap 258 is sized to provide for a minimal flow or leakage path therethrough.

Outer race 244 has a substantially planar bearing surface 260 thereon which may also be referred to as a first bearing surface 260. Second race 246 is disposed in recess 234 such that the second race substantially flatly contacts race engagement surface 240 on rotor 206. Second race 246 has a substantially planar bearing surface 262 thereon. Bearing surface 262 may also be referred to as a second bearing surface 262 which faces first bearing surface 260.

Bearing cage 248 is disposed longitudinally between first and second bearing surfaces 260 and 262 and radially between annular portions 254 and 256 of first race 244. As with the first embodiment, bearing elements 252 are roller bearings so that a roller thrust bearing is formed, but the invention is not intended to be limited only to roller bearings. For example, but not by way of limitation, ball bearings might also be used.

In operation, machine 202 is assembled as shown in FIG. 4. As previously described, rotor 206 is slightly narrower than case 210. Thus loading in a longitudinal direction will be absorbed by bearings 232 which will also absorb radial loading.

The sealing of fluid in cavity 242 is provided by a labyrinth-like flow path through seal and bearing assembly 200. That is, fluid pressure in housing 204 will cause fluid to flow to radially inwardly toward seal and bearing assembly 200. Any fluid leaked must flow between annular portion 254 of outer race 244 and outer groove 236 through the corresponding gap 258, around cage 248 and bearing elements 252 between first and second bearing surfaces 260 and 262, and between annular portion 256 of first race 244 and inner groove 238 through the other gap 258. All of the components are sized with close tolerances so that there is a significant pressure drop through this flow passageway which results in a relatively low pressure radially inwardly of seal and bearing assembly 200 and minimal leakage. The fluid flow that does occur also provides lubrication for bearing elements 252 and bearing surfaces 260 and 262 and also provides lubrication for carrier bearings 232.

Although second embodiment seal and bearing assembly 200 has been described as having certain rotating components and stationary components, those skilled in the art will see that these rotating and stationary components can be reversed and that the seal and bearing assembly 200 will function in the same manner.

It will be seen, therefore, that the seal and bearing assembly of the present invention is well-adapted to carry out the ends and advantages mentioned, as well as those inherent therein. While presently preferred embodiments of the invention has been described for the purposes of this disclosure, numerous changes in the arrangement and construction of parts may be made by those skilled in the art. All such changes are encompassed within the scope and spirit of the appended claims.

What is claimed is:

1. A seal for use adjacent to a rotating surface and a stationary surface and comprising:
   a ring having a sealing surface for substantially sealing between at least a portion of said stationary surface and said sealing surface, said ring further having a race engagement surface thereon and defining a pair of annular grooves therein;
   a first race adapted for engagement with at least a portion of said rotating surface and rotation therewith, said first race comprising a pair of annular portions, each of said portions extending into one of said grooves;
   a second race adapted for engagement with said race engagement surface; and
   a plurality of bearing elements disposed between said first and second races.

2. The seal of claim 1 wherein said grooves are substantially concentric.

3. The seal of claim 1 wherein ends of said annular portions are spaced from bottom surfaces of said grooves.

4. The seal of claim 1 wherein said race engagement surface of said ring is between said grooves.

5. An apparatus comprising:
   a stationary housing having a housing sealing surface therein;
   a rotor rotatably disposed in said housing;
   a ring having a ring sealing surface thereon for substantially sealing along at least a portion of said housing sealing surface and further having a bearing race engagement surface thereon and defining a pair of substantially concentric annular grooves therein;
   a first bearing race adapted for engagement with at least a portion of said rotor and rotatable therewith, said first bearing race comprising a pair of annular portions, each of said portions extending into one of said grooves;
   a second bearing race adapted for engagement with said race engagement surface;
   a bearing cage defining a plurality of bearing openings therein disposed between said first and second bearing races; and
   a plurality of bearing elements disposed in said bearing openings.

6. The apparatus of claim 5 wherein:
   said grooves have bottom surfaces which face one another; and
   ends of said annular portions and said bottom surfaces of said grooves define a gap therebetween.

7. The apparatus of claim 5 wherein said race engagement surface of said ring is between said grooves.

8. A seal for use adjacent to a rotating race engagement surface and a stationary race engagement surface, wherein one of said rotating race engagement surface and said stationary race engagement surface defines a pair of annular grooves therein, comprising:
 a first race adapted for engagement with one of said rotating race engagement surface and said stationary race engagement surface, said first race defining outer and inner annular portions, each of said annular portions extending into one of said grooves;
 a second race adapted for engagement with the other of said rotating race engagement surface and stationary race engagement surface, said second race being disposed between said annular portions of said first race; and
 a plurality of bearing elements disposed between said first and second races.

9. The seal of claim 8 wherein said annular portions are substantially concentric.

10. The seal of claim 8 wherein ends of said annular portions are sized to be spaced from bottom surfaces of said grooves.

11. A seal for use adjacent to a rotating surface and a stationary surface and comprising:
 a ring having a sealing surface for substantially sealing between at least a portion of said stationary surface and said sealing surface, said ring further having a race engagement surface thereon separate from said sealing surface;
 a first race adapted for engagement with at least a portion of said rotating surface and rotation therewith, said first race defining a recess therein;
 a second race adapted for engagement with said race engagement surface; and
 a plurality of bearing elements disposed between said first and second races, wherein said second race and bearing elements are disposed in said recess.

12. An apparatus comprising:
 a stationary housing having a housing sealing surface therein;
 a rotor rotatably disposed in said housing;
 a ring having a ring sealing surface thereon for substantially sealing along at least a portion of said housing sealing surface and further having a bearing race engagement surface thereon separate from said ring sealing surface;
 a first bearing race adapted for engagement with at least a portion of said rotor and rotatable therewith, said first bearing race defining a recess therein;
 a second bearing race adapted for engagement with said race engagement surface;
 a bearing cage defining a plurality of bearing openings therein disposed between said first and second bearing races; and
 a plurality of bearing elements disposed in said bearing openings, wherein said second bearing race, bearing cage and bearing elements are disposed in said recess.

13. A seal for use adjacent to a rotating surface and a stationary surface and comprising:
 a ring having a sealing surface for substantially sealing between at least a portion of said stationary surface and said sealing surface, said ring being spaced from said rotating surface and further having a race engagement surface thereon separate from said sealing surface;
 a first race adapted for engagement with at least a portion of said rotating surface and rotation therewith, said first race having a substantially planar first bearing surface thereon;
 a second race adapted for engagement with said race engagement surface, said second race have a substantially planar second bearing surface thereon, said first and second bearing surfaces being substantially parallel; and
 a plurality of bearing elements disposed between said first and second races and engaging said first and second bearing surfaces.

14. A seal for use adjacent to a rotating surface and a stationary surface and comprising:
 a ring having a sealing surface for substantially sealing between at least a portion of said stationary surface and said sealing surface, said ring being spaced from said rotating surface and further having a pair of race engagement surfaces thereon disposed on opposite sides of said ring and separate from said sealing surface;
 a pair of first races adapted for engagement with different portions of said rotating surface on opposite sides of said ring and adapted for rotation therewith;
 a pair of second races disposed on opposite sides of said ring and adapted for engagement with a corresponding one of said race engagement surfaces; and
 a plurality of bearing elements disposed between corresponding ones of said first and second races.

15. An apparatus comprising:
 a stationary housing having a housing sealing surface therein;
 a rotor rotatably disposed in said housing;
 a ring having a ring sealing surface thereon for substantially sealing along at least a portion of said housing sealing surface, said ring being spaced from said rotor and further having a bearing race engagement surface thereon separate from said ring sealing surface;
 a first bearing race adapted for engagement with at least a portion of said rotor and rotatable therewith, said first bearing race having a substantially planar first bearing surface thereon;
 a second bearing race adapted for engagement with said race engagement surface, said second bearing race having a substantially planar second bearing surface thereon, said first and second bearing surfaces being substantially parallel;
 a bearing cage defining a plurality of bearing openings therein disposed between said first and second bearing races; and
 a plurality of bearing elements disposed in said bearing openings and engaging said first and second bearing surfaces.

16. An apparatus comprising:
 a stationary housing having a housing sealing surface therein;
 a rotor rotatably disposed in said housing;
 a ring having a ring sealing surface thereon for substantially sealing along at least a portion of said housing sealing surface, said ring being spaced from said rotor and further having a pair of bearing race engagement surfaces thereon on opposite sides of said ring and separate from said ring sealing surface;

a pair of first bearing races adapted for engagement with different portions of said rotor on opposite sides of said ring and rotatable with said rotor;

a pair of second bearing races disposed on opposite sides of said ring and adapted for engagement with a corresponding one of said race engagement surfaces;

a pair of bearing cages defining a plurality of bearing openings therein disposed between said corresponding ones of said first and second bearing races; and a plurality of bearing elements disposed in said bearing openings of the bearing cages.

* * * * *